United States Patent [19]

Eisele

[11] 4,095,351
[45] Jun. 20, 1978

[54] NAVIGATIONAL SIMULATOR AND TEACHING DEVICE

[76] Inventor: Adrian S. Eisele, R.R. 1, Germantown, Ill. 62245

[21] Appl. No.: 735,629

[22] Filed: Oct. 26, 1976

[51] Int. Cl.² .............................................. G09B 9/08
[52] U.S. Cl. ..................................... 35/10.2; 35/12 L
[58] Field of Search .............. 35/10.2, 11, 12 R, 12 F, 35/12 L, 12 N, 12 P

[56] References Cited

U.S. PATENT DOCUMENTS

| 2,396,141 | 3/1946 | Adorjan et al. | 35/12 R X |
| 3,485,929 | 12/1969 | Tillery | 35/10.2 |
| 3,507,969 | 4/1970 | Greenwade | 35/10.2 |
| 3,546,351 | 12/1970 | Bryan | 35/12 R X |

FOREIGN PATENT DOCUMENTS

| 524,295 | 4/1956 | Canada | 35/10.2 |

*Primary Examiner*—Jerry Smith
*Attorney, Agent, or Firm*—Jack E. Dominik

[57] ABSTRACT

A Navigation simulator and teaching aid is disclosed which utilizes a terrain plate and a plurality of Navaid pegs which are selectively positionable in various holes in the terrain plate which correspond to simulated navigational radio aids. Elastomeric lines are connected to a model aircraft and swivel or are otherwise swivelably secured to a portion of the navaid pegs, the opposite end of which is secured to the model aircraft above a pair of compass roses, each of which rotatable relative to the point of attachment of the line as well as the model aircraft or selectively may be fixed with regard to the model aircraft. The terrain plate is provided desirably with symbols of navigational aids corresponding to those of published approach plates, high density areas, and in route navigational charts of the character regularly used by airline pilots, and other pilots flying under instrument flight rules, irrespective of whether they have ground contact or must rely totally on the instruments for navigation.

10 Claims, 6 Drawing Figures

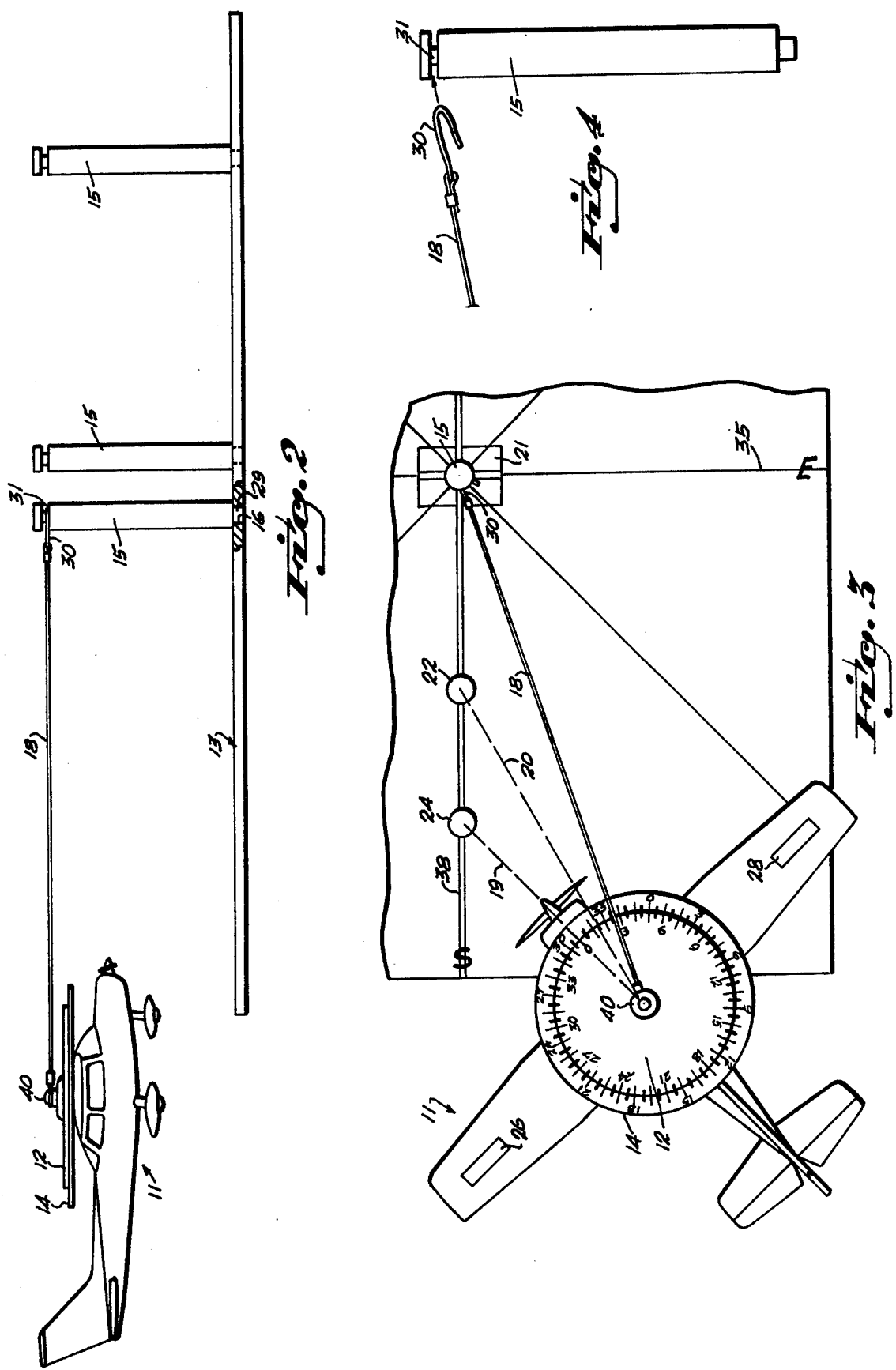

NAVIGATIONAL SIMULATOR AND TEACHING DEVICE

FIELD OF THE INVENTION

The present invention relates to a navigation simulator and teaching aid, and more particularly such a navigational aid and teaching aid which implies a simulated model aircraft, and a terrain board, and cords between the aircraft and simulated navigational aids so that the student in particular can visualize the relationship between the model aircraft and navigational aids in terms of moving angular relationships of the radial from the model aircraft to the simulated navigational aid. The simulation, while taking place in the confines and quiet of a living room, den or office simulates the same angular relationships as are noted in flight. The prior art is generally classified in class 35, subclass 10.2, and 12.1.

Prior Art

Flight simulators and teaching aids for navigational purposes take on a wide variety of configurations. For example, the well known "Link" trainer simulates a small aircraft in which the student mounts a position inside the aircraft, and thereafter with a hood closed over the top, manipulates the controls including the control wheel, pedals, throttle, and the like to fly in a completely "blind" condition. While he is flying, the air speed indicator artificial horizon, compass, directional gyro, and radio navigational aids are all moving in accordance with the particular problem as programmed by the flight instructor. With such a flight simulation device, the student pilot must not only grapple with the problems of navigation and the complex angular relationships between the various navigational instruments, but also the problem of maintaining straight and level flight, climbing and descending, as well as turning with appropriately coordinated turns. The student prior to entering into such a simulator desirably has a mental image of the navigational problem with which he is dealing.

Certain patents such as U.S. Pat. No. 3546315 do disclose a non-directional beacon with an azimuth on an aircraft, but do not have the physical properties in order to deal with the moving relationship between the aircraft and the non-directional beacon, the compass orientation at the time, as well as other navigational assists of the electronic nature. On the other hand, U.S. Pat. Nos. 3485929; 2508366; and 2418834 in addition disclose a model aircraft and a direction to a Navaid, as does U.S. Pat. No. 2404386 disclosing what is generally known as an ADF (automatic direction finder) which points the radio to a non-directional beacon. Canadian Pat. No. 524295 also discloses a string or cord related to a non-directional beacon or ADF, but otherwise fails to relate the position of the aircraft, its direction, or its members to the various complex navigational aids which are encountered in normal instrument flight.

SUMMARY

The present invention of a navigation simulator and teaching device is predicated upon the use of a terrain plate which will have portions marked on it corresponding to the typical approach plate, high density area chart, or in route navigational chart and its associated navigational aid as a regularly used in connection with instrument flight. Means are provided on the terrain plate to mount a plurality of navigational pegs which are vertical posts extending upwardly and essentially perpendicular with the terrain plate, to which cords can be attached, preferably swiveling to connect the navigational aid with a model aircraft simulating the aircraft being flown, a top which or with relation to which a compass rose is mounted, with the cord extending preferably from the compass rose and coaxial therewith, but swivelable independently of the capability of the compass rose's rotation. Desirably a second compass rose interiorly of the first compass rose's employed to the end that the one may be fixed with regard to the aircraft simulating the typical ADF indicator in the cockpit, and the other may be rotated to a compass heading, simulating the aircraft compass or directional gyro. Optionally several cords may be employed, one simulating the rhumb line from the aircraft to a facility such as an airport another to a non-directional beacon and a third to a VOR or omni station or alternatively coupled to the localizer at an airport.

In view of the foregoing it is the principal object of the present invention to provide a navigational aid and teaching device which permits a student pilot, in the quiet of his living room, den, or office to visually manipulate the model aircraft and simulate its relationship with navigational aids and a landing facility, to the end that when he climbs in the cockpit of the aircraft and the actual instruments are employed, a similar or identical problem conducted in the air will reveal similar or identical relationships between the instrument needles and indications as those previously illustrated by the cords and model aircraft.

Still another object of the present invention is to provide a navigational simulator and teaching aid which is adaptable, by means of placing different patterns and problems on the terrain plate, to a wide variety of approaching navigational problems including not only the pilot's home airport, but other airports where he may frequently be flying to during his training program, or indeed, any airport which he may be flying in a proposed trip.

Still another object of the present invention is to provide a navigation simulator and teaching device which bears a direct and faithful relationship to the approach plates, in route charts and high density charts which are used by scheduled airlines, and approved by the government sources publishing the same to the end that the teaching will be done with the ultimate chart which will be used by the student pilot when he concludes his instrument training, and therefor no subsequent transition to a different type of chart will be required.

Still another, but most important object of the present invention, is to achieve the aforesaid objectives from a standpoint of utilizing a navigational simulator and teaching aid in a construction which is inherently economical, and in which there are no electrically, hydraulically, or other driven parts. The manipulation is the sole function of the hands of the student, which permits him to move as slowly or as rapidly as his learning curve dictates.

Still another object of the present invention is to provide a navigation simulator and teaching aid which can be programmed in its complexity, thereby first utilizing a single cord and a rhumb line approach to an airport, secondly teaching the pilot the relationship between going to the airport and a non-directional beacon, and thirdly it imposing thereon the transition or subsequent and ultimate coordination with an omni range station, and finally, the transition to an ILS localizer. The various simulations just described may not be applied in that order, that is, it is entirely possible that the very first teaching aid will be with regard to the use of an omni directional approach, and secondly the non-directional beacon. The student can experiment, by himself, with which of the combinations makes him most comfortable.

DESCRIPTION OF DRAWINGS

Further objects and advantages of the present invention will become apparent as the following description of an illustrative embodiment takes place, taken in conjunction with the accompanying illustrative drawings in which:

FIG. 2 is a longitudinal transverse sectional view of the navigational simulator shown in FIG. 1 in slightly reduced scale, and illustrating particularly the vertical relationship between the model aircraft and the terrain plate, as well as the relationship between the cord and the Navaid peg.

FIG. 3 is a partially broken plan view of the navigation simulator illustrating the aircraft in a direct relationship to approaching the ILS at a particular airport for a landing to the north, and disclosing three cords in use.

FIG. 4 is a front elevation of the Navaid peg showing in exploded relationship the connection between the Navaid peg and the rhumb line cord, and more particularly the swivel which is secured to the cord and in turn may be removably secured to the Navaid peg, and in similar fashion, removably secured to the model aircraft.

DESCRIPTION OF ENVIRONMENT AND PROBLEMS TO BE STUDIED AND APPROPRIATE NAVIGATIONAL AIDS

Figure 1:
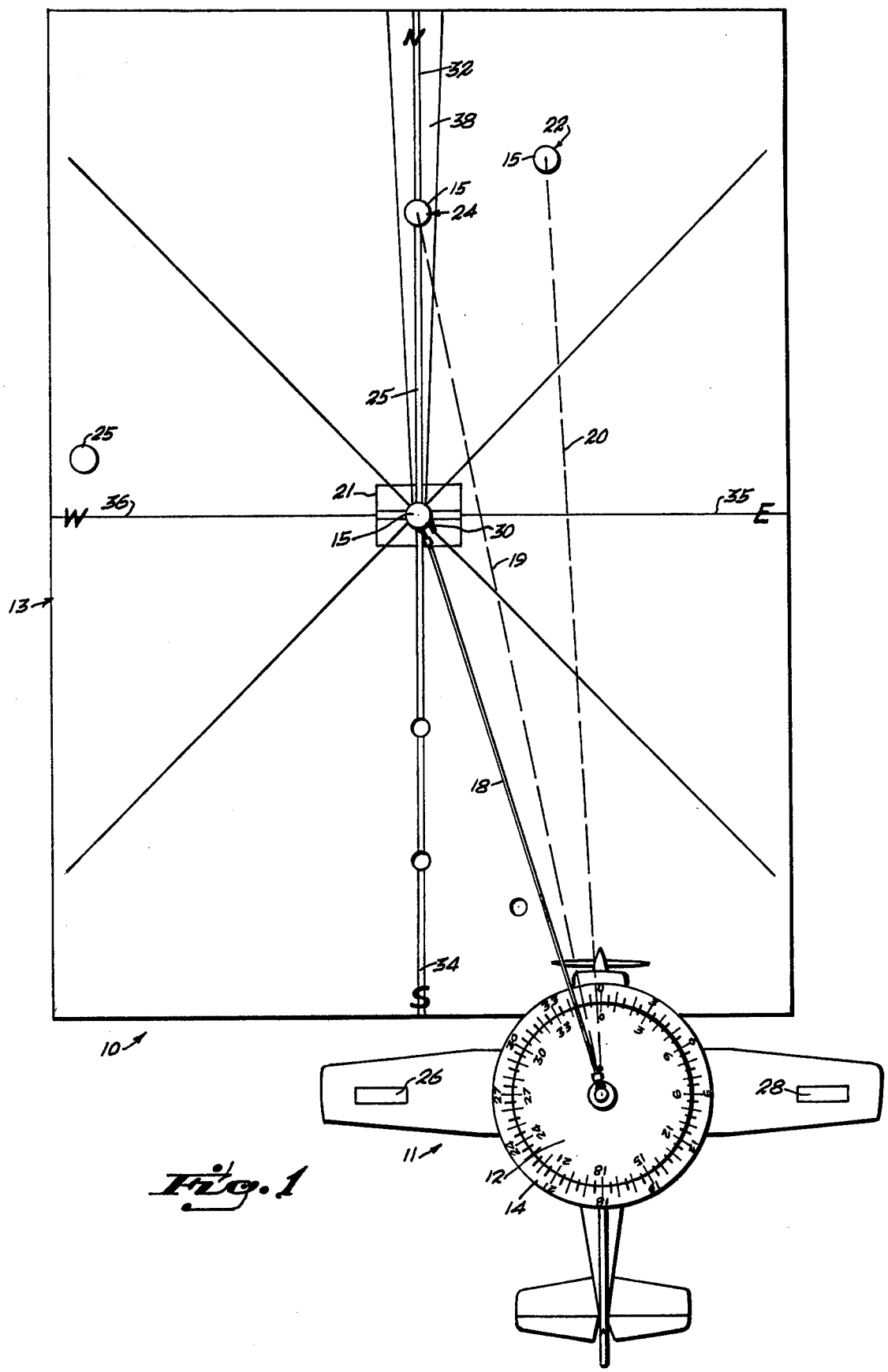
FIG. 1 is a plan view illustrating the terrain plate and simulated aircraft with an airport facility at the center, and the airplane approaching from the south to plan a pass northbound past the airport, and landing to the south.

Prior to discussing the navigation simulator 10 shown generally in FIG. 1, it will be helpful to describe the navigational aid and other representations which appear on it.

Non-Directional Beacon (NDB)—Automatic Direction Finder (ADF)

Any radio signal has a directional effect to some degree. The typical radio station sends out a powerful signal, and by polarizing the signal, preferably with a loop type antenna, the angular relationship between the signal and a body having the appropriate receiver and loop can be determined. Bearing this in mind, if an aircraft is flying in any direction, but knows that a particular radio station as close to the home air field, having such a receiver will permit the pilot to navigate to the radio station, and thereafter be close to the home airport and consequently proceed directly, if visual indications permit. Such a receiver can have an ambiguity between to and from but this is overcome in the device known in most aircraft as the automatic direction finder or ADF. An ADF reads also the signal of a non-directional beacon, which may be an aircraft navigational facility located at a particular location, for purposes of assisting aircraft in approaches to airports. Such non-directional beacon or NDB is designed for aircraft navigation purposes only, and may or may not have a voice. Most NDB, however, have a particular Morse code of two or three letters so that in addition to identifying the same by tuning in its published frequency, the pilot can listen to the code and doubly identify the particular navigational aid. Voice may or may not be broadcast over an NDB, but if it is, the voice will normally identify the NDB, and contain updated recordings of weather and flight conditions at the airport, and any other information highly desirable to airmen in the area.

VOR—Omni Range

The omni range operates on very high frequencies, and in line of sight in its transmission. Because of the high frequency, however, it is virtually static free. Naturally when the weather is at its worse, is when the static is at its best. Consequently the omni range or VOR navigational facilities have the desirable feature of avoiding the interference of static caused by lightning and the like, and being highly accurate. They suffer the disadvantage of being in line of sight, but generally speaking are located at airports, on hill tops, and on frequent spacing to the end of an aircraft flying safely above the terrain will never be out of reach of a VOR or omni station. The VOR presupposes a transmission of directional beams, 360 in number for purposes of illustration, but in electronic reality, infinitely variable. The pilot then selects the particular VOR frequency on his radio, and that blocks his navigational facility into one particular transmitter. Thereafter a dial on the aircraft permits the pilot to select the heading he wants, or alternatively to determine the radio he is then receiving the VOR transmitter. Either of these two functions may be valuable. When the pilot is lost, obviously the first thing he does is tune in a VOR and identify it. Thereafter in looking on a map he can tell the area around that particular station. Secondly he then rotates the compass rose until the needle in the center of the VOR centers. That tells him his radial to or from, and this is subsequently verified by the (TO-FROM) as to whether it is the 180° radial from, or the 360° radial to, both of which are the same.

ILS Localizer

Having just described the VOR or omni range, one can then visualize an ILS localizer which is one of the 360 radials transmitted by the omni range station, and beamed down the center of a main runway at the airport. This beam may extend outwardly anywhere from 5 to 25 miles from the airport. When the localizer frequency is selected by the pilot, he is not able to turn the compass rose on the VOR reading to determine the radial to or from the ILS localizer. Once he is on the localizer, however, centered down the imaginary line extending from the center of the runway, the indicator needle will be to the left or right of center of the instrument. The basic rule is to "fly toward the needle." Thus if the needle is to the left of center, the pilot corrects slightly to the left. Assuming that the runway is an east-west runway and the pilot is landing to the east, and he notices the needle is to the left, he must take a heading slightly north of east in order to get back on course. This off-course situation may be the result of faulty navigation, inaccurate pilotage, or changes in wind drift. Irrespective of how the deviation occurs, the correction is essentially the same. When the pilot is away from the ILS localizer, he may wish to navigate to a particular point on the ILS localizer. This is provided for in practically all instrument approaches at major airports by means of a non-directional beacon known as an outer-compass-locater which is spaced anywhere from 4 to 7 miles away from the threshold of the instrument runway. At this point the pilot tunes in his ADF to the frequency of the compass locater, and then steers with his needle in the center to the compass locater while the instrument landing system or ILS is also switched on. In theory, when he comes out over the compass locater his to-from needle on the ADF will swing from 0 to 180, and at the same time, the omni range ILS needle will center. Thereafter, he no longer utilizes the non-directional beacon, but rather undertakes the heading of the runway and the localizer, and guides his pathway to the airport runway by keeping the needle centered and descending in accordance with either a times rate of decent, or a glide slope. The present invention does not deal with glide slope other than as it can be imagined by the student as he manipulates the simulated aircraft.

DESCRIPTION OF PREFERRED EMBODIMENT

Bearing the above description in mind of the navigational facilities and the techniques employed by the pilot and utilizing the same, it will be seen that in FIG. 1 the navigation simulator or teaching aid 10 presupposes a model aircraft 11, having an outer compass rose 12 at its upper portion, also including an inner compass rose 14. The principal portion of the unit is the terrain plate 13 which may have a plurality of markings, depending upon the particular problem to be negotiated. In this instance it will be seen that the four compass points are identified on the terrain plate 13, namely north 32, south 34, east 35, and west 36. The letters identifying these points on the compass are shown on FIG. 1, and desirably will be there for the student to use in his beginning orientation. Also to be noted is a simulation of an airport 21 at the center of the terrain plate 13, as well as a simulation of the ILS localizer 38 heading toward the airport. In this particular instance the airport 21 is shown at the center of the compass points 32, 34, 35, 36, but need not be in that location, particularly for a problem involving a student whose orientation and utilization of the various Navaids have advanced.

Important to the utilization of the terrain plate 13 is the provision of the Navaid peg 15, here shown at the center of airport 21. As will be noted in FIG. 2, the Navaid peg 15 is positioned into a Navaid hole 16 in the terrain plate 13, and secured there by means of the mounting peg 29 at the lower portion of the Navaid peg 15, all as shown in greater detail in the enlarged view of a Navaid peg 15 shown in FIG. 4.

The upper portion of the Navaid peg 15 (again see FIG. 4) is provided with a collar 31 to which a swivel 30 may be removably secured. The swivel 30, in turn, is coupled to a cord 18 which (see now FIG. 1) is swivelably secured to the Navaid peg 15 and also to the simulated aircraft 11 at the simulated aircraft swivel mount 40. In this instance, as shown in FIG. 1, the first cord, preferably an elastomeric type cord 18, it is shown and described as a rhumb line cord 18. The rhumb line traditionally in waterborn navigation, is the course from the point of departure to the point of intended conclusion of that leg of the journey. In the present instance, of course, as shown in FIG. 1 the rhumb line 18 is directed from the simulated aircraft 11 to the airport of intended landing 21, as shown. This permits the student to visualize the continual orientation of his aircraft 11 with the airport 21 where he intends to land. Nonetheless, the navigational aid in this particular problem is not shown directly at the airport 21, and consequently additional information must be read in the aircraft from the appropriate instrument. To this end, the simulation is of a VOR for omni range station 22 located north of the aircraft and north and somewhat east of the airport, also having a Navaid peg 15 secured as just described. The VOR 22, however, is connected to the simulated aircraft 11 by means of the VOR cord 20. The student then can observe as the simulated aircraft moves whether the needle is to the left or right of the aircraft. For example, is a simulated aircraft 11 as shown in FIG. 1 is maneuvered to a position directly over the E identifying east in the compass coordinate 35. The VOR cord 20 will be to the left of the center of the aircraft which, when visualized as VOR needle within the aircraft, signals the pilot that he needs to turn left in order to get back to the course which he has pre-selected. Assuming the preselected course was taken from the position as shown in FIG. 1, and yet the aircraft is off the course to the east as just described, the pilot then knows that he should make a left turn to get back on course to find his way to the VOR station 22.

Once the pilot is at the VOR 22, he may then be vectored by air traffic controller into a particular pattern to intercept the radial ILS 38. On the other hand, should he lose voice communication, or should the controller not have control of this flight, he may then wish to proceed outbound from the VOR 22 on a heading of 360° or indeed on a heading of 45° in order to subsequently make a 180° turn in order to return and intercept the localizer 38. With either of these problems, the student may visualize the same since the outer rose 12 on the simulated aircraft 11 can be, optionally, fixedly secured at 0. Thereafter the NDB or ADF line 19 will show the same position that the needle in the aircraft would show as the navigation with regard to the VOR facility 22 proceeds. At any location of the aircraft the non-directional beacon or NDB or ADF line 19 will show the heading with relationship to the heading of the aircraft in order to fly to the NDB 25. The inner rose 14 may be set to simulate the heading of the directional gyro within the aircraft, or the magnetic compass within the aircraft. Presumably the magnetic compass and the directional gyro will be in the same direction, because directional gyro's are power driven, either electric or vacuum, instrument it is possible that the power may fail, that the instrument may break, or in addition that the gyro itself even operating properly will precess. The student is taught of this phenomenon and aware of it, and therefor can utilize the inner-rose 14 either as a directional gyro or magnetic compass depending upon the problem with which he is confronted. An additional line, if required can be employed with the localizer 38, or alternatively the VOR localizer line 20 by means of removing the swivel clamp 30 from the Navaid peg 15 associated with the VOR 22 may then reposition the VOR line or cord 20 at the airport 21 coincidental with the rhumb line 18. In short, the rhumb line and localizer for this particular problem become the same on the localizer approach.

As a further option, the simulated aircraft 11 may be provided with a blue panel 26 and a yellow panel 28 on the wings of the aircraft, the blue and yellow simulating the left and right indications on the VOR on some omni range receivers, and also the respective colors on either side of the localizer 38. In most professionally equipped aircraft, and those with the advance state of the art with regard to the omni range indicators as well as localizer, the color coatings are no longer used. Nonetheless many flight simulators continue to use those colors, and consequently the student in manipulating his aircraft 11 and observing the position of the navigational cord radials 18, 19, 20, can further relate these to the color panels 26, 28 on the simulated aircraft 11.

Turning now to FIGS. 2, 3 and 4, as previously discussed, the simulated aircraft 11 is positioned above the terrain plate 13 by the student while it is manipulated and the flexible cord moves with regard to the nav post 15. Still another feature which can be simulated is that the DME or distance measuring equipment. The DME operates on a doppler type electronic principal and by sending out a signal to a given station, and timing the phase relationship between the return, the distance between the aircraft and the station can be measured. In certain approaches known as an orbiting approach, one maintains a constant distance from the vortac station (VOR plus Tacan) which station has the omni range facility and the DME facility all at one spot. To this end, the student manipulating the simulated aircraft 11, despite the fact that the radial cord is flexible, will maintain the cord at a constant radius from the Navaid peg 15, thereby simulating the DME orbiting function.

A different problem is illustrated in FIG. 3 the Navaid peg 15 are positioned sequentially along a localizer 38 which may not necessarily be in accordance with one of the points of the compass. The aircraft 11 as shown in FIG. 3 is being navigated with the NDB line 19 directed to the NDB facility 24 by means of the coupling to the appropriate Navaid peg 15. At the same time that this navigation takes place, with the outer compass rose showing 0, the inner-compass rose 14 may be adjusted to the compass heading. Thus the student can visualize the varying in the compass heading as the various Navaids are encountered. The VOR localizer line 20 FIG. 3 is coupled to the VOR 22 which often times may be utilized for an approach to the airport, separate and independent of the localizer 38. Indeed, many smaller airports have their instrument approaches facilitated only by a VOR station, some known as a TVOR when they are located at the airport, and others may be anywhere from 4 to 15 miles away from the airport. Where various distances are mentioned in this description of the utilization of the navigation simulator and teaching device, it should be born in mind that in certain instances the facility may be closer or further than the distances described, consequently the distances described are not for purposes of limiting the invention, but rather for purposes of illustration to one skilled in the art.

Figure 5:
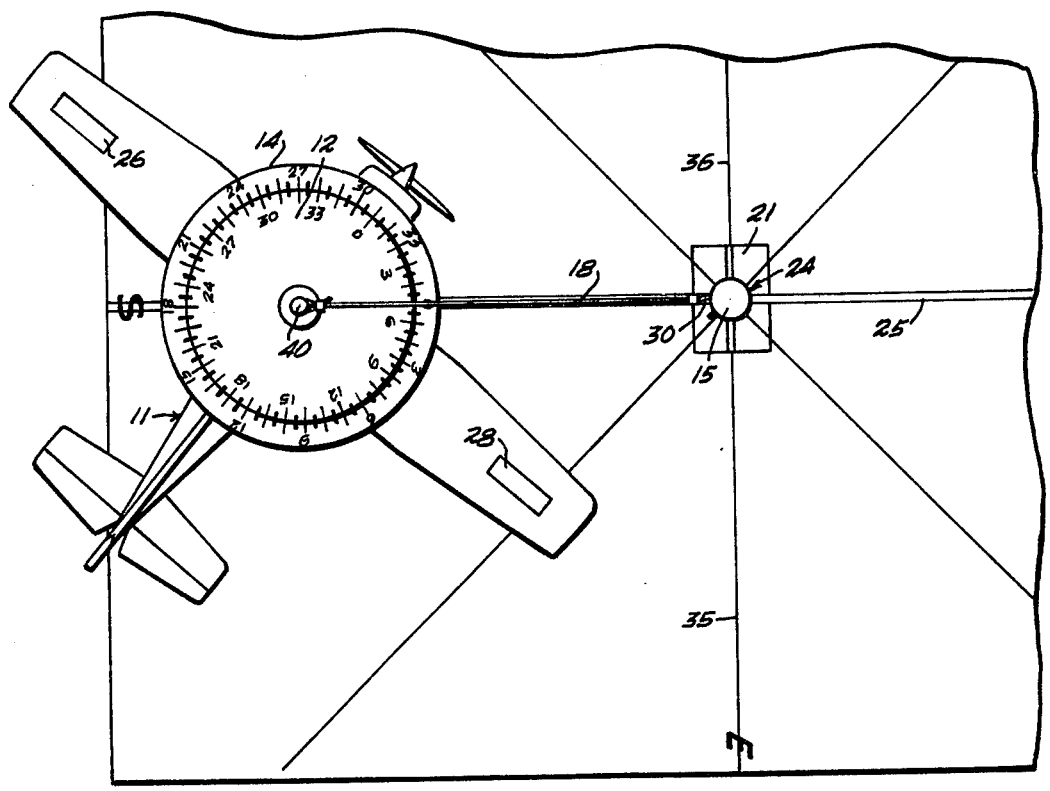
FIG. 5 is illustrative of an intercept problem with a non-directional beacon in which the aircraft is to intercept a radial at a 45° angle to the path of flight.
Figure 6:
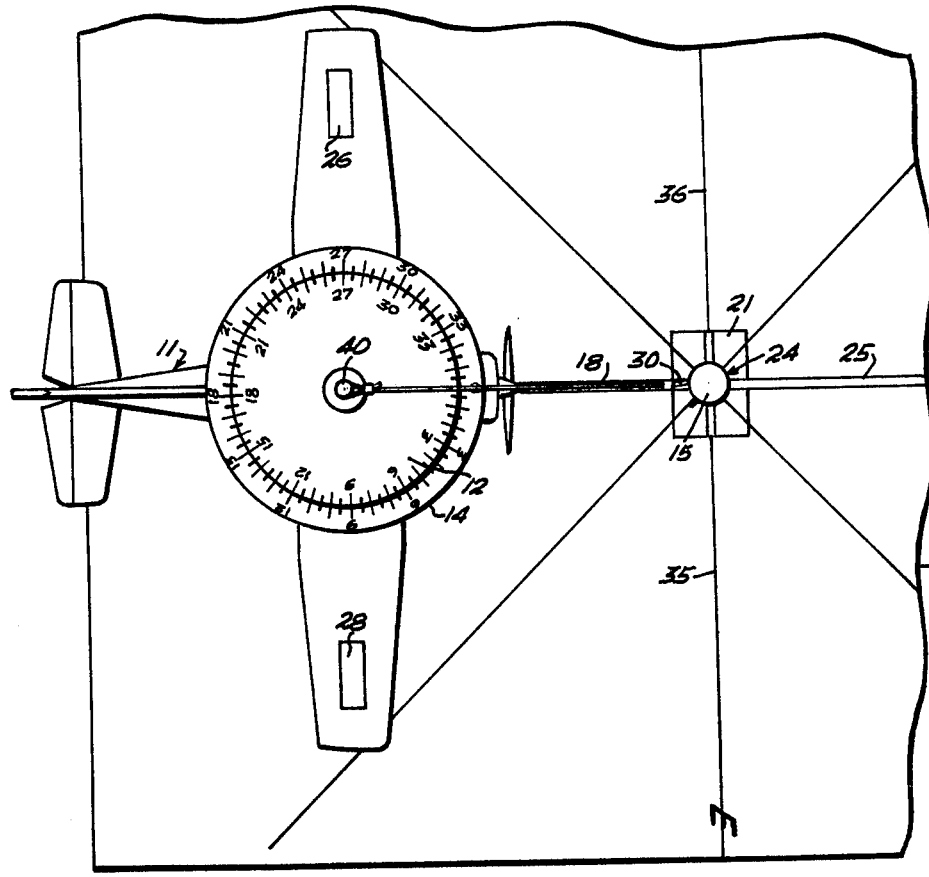
FIG. 6 is a subsequent or sequential view to that of FIG. 5 illustrating the changed relationship in the compass rose, and the cord, to the aircraft and the navigational facility after completing the intercept program in FIG. 5 and making the turn inbound to the navigational facility as shown in FIG. 6.

Finally, as noted on FIGS. 5 and 6, it will be seen that the outer-compass rose 12 in FIG. 5 has been rotated in order to preprogram a 45° intercept to a non-directional beacon. The 0 of the outer-rose was moved to a 45° location simulating the rotation of the dial within the aircraft. Thus when the rhumb line 18 or here shown as the ADF line crosses the 0 pointer on the outer rose, the pilot then knows that he has accomplished his intercept and then makes a right turn, before or after removing the outer rose 12 to the 0 center position as shown in FIG. 6, and he then tracks inbound on the rhumb line or ADF NDB line 18 until arriving at the simulated NDB beacon 24 which includes the Navaid peg 15.

Variations are contemplated particularly as to the inditia which appear on the surface of the terrain plate 13 as shown in FIG. 1. For example, approach plates taken directly from a coast and geodetic survey plate can be drawn with a grease pencil or a washable ink on the terrain plate 13 including frequencies, magnetic headings, distances, and the like. The holes which receive the Navaid peg mounting peg 29 can be in a wide variety of locations in accordance with the problems to be solved and simulated.

The Method

The method of this invention contemplates the teaching of navigation by instruments, in varying degrees of complexity, utilizing a simulated aircraft. The steps run progressively between connecting a flexible member to a simulated aircraft and one simulated Navaid facility to sequentially thereafter adding additional flexible members to additional and different simulated Navaids. A further step in the method is providing the student with a terrain plate having a simulated airport and/or simulated in route set of Navaid facilities which can be progressively followed, intercepted, and the subject of pilot orientation while the simulated aircraft is maneuvered manually by the student, and at the speed he chooses to advance the aircraft. A final step in the method contemplates the utilization of a compass rose, or two compass roses, on a simulated aircraft, one of which simulates the ADF or automatic direction finder within the aircraft, and the other may simulate the magnetic compass or directional gyro in the simulated aircraft.

Although particular embodiments of the invention have been shown and described in full here, there is no intention to limit the invention to the details of the embodiment or embodiment shown. By way of example, the same outline can be used with a chart of a river estuary, harbor, or the like and instead of the simulated aircraft, a simulated boat can be shown. This would permit the student skipper to evaluate the utilization of a non-directional radio beacon, often times located at airports close to the shoreline, or separately located at lighthouses and the like, to determine the relationship between his compass heading, and the non-directional beacon for purposes of navigation. In addition, many boats carry omni range receivers along with VHF transceivers. With an antenna at a sufficient height, for example in an area like Miami where Biscayne Omni is located in Biscayne Bay, not only can the non-directional beacon be used by the skipper, but also the omni range equipment. Consequently the following claims are intended to cover the spirit and scope of the invention, and are directed to all modifications, alternatives, embodiments, usages and equivalents that one skilled in the art would develop from the description and drawings set forth above, as well as the claimed subject matter in the following appended claims.

What is claimed is:

1. A navigation simulator and training aid for visually illustrating a navigational instrument reading as an angular relation between a vessel and a navigational aid utilized suitable for self-instruction by a student, comprising in combination
    a horizontal map including simulated navigational aids
    a rigid vertical navigational peg having an upper and lower end
    lower end of said peg having means to attach to said map
    an extensible member
    means at the upper end of said peg for securing one end of said extensible member
    a simulated vessel attached to the other end of said extensible member
    a means for indicating the angle between the directional axis of said simulated vessel and said extensible member, whereby upon moving the vessel with relation to the navigational aid the radial relationship and vector to the navigational aid move in simulated relationship to each other.

2. A device according to claim 1 wherein said means for indicating the angle between the directional axis of said simulated vessel and said extensible member comprises,
    a thin disc imprinted with a compass rose,
    a thin disc of smaller diameter than the aforementioned thin disc, also imprinted with a compass rose concentric with and swivelably secured to said larger disc,
    one such disc suitable for showing magnetic heading including appropriate local deviation, and,
    one such disc suitable for showing a heading to a navigational aid,
    whereby the student may move, reposition, or stop all elements for self study of simulated travel and related navigational readings.

3. A device according to claim 1, further comprising, in combination,
    more than one vertical rigid navigational peg attached to said map
    a number of extensible members equal to the number of said navigational pegs, where each of said extensible members has one end swivelably attached to one of the said navigational pegs, and the other end swivelably attached to the said simulated vessel at the same point.

4. A device according to claim 3 wherein said map is a horizontal planar member having a plurality of circular holes of small diameters therein
    the lower end of said navigational pegs being a cylindrical member with a diameter slightly smaller than that of the said holes in said map
    the means for attaching said vertical rigid members to said map is forcing the cylindrical end of said navigational pegs through one of the said holes in the said map, whereby said navigational peg is held in place by friction.

5. A device according to claim 4 further comprising in combination
    an aircraft terrain approach plate issued by the FAA superimposed on said map.

6. A device according to claim 3 wherein said extensible members are each of a different color in order to distinguish between each of the said extensible members, and the corresponding navigational pegs.

7. A device according to claim 3 wherein a high density area chart distributed from the National Ocean Survey, is superimposed on said map, whereby the said navigational pegs correspond to the navigational aids depicted on said high density area chart.

8. A device according to claim 3 wherein said simulated vessel is a model aircraft.

9. A device according to claim 8 further comprising in combination a blue panel on the left wing of said model aircraft
    a yellow panel on the right wing of said model aircraft
    one of said navigational pegs representing a VOR.

10. The method of navigation self-study by visually illustrating the angular relation between a simulated vessel and certain navigational aids which comprises the steps of:
    swivelably connecting a plurality of extensible members to a simulated vessel and swivelably connecting the other end of each extensible member to a navigational aid peg
    providing the student with a horizontally disposed chart with locations thereon for placing the navigational pegs
    positioning an inner compass rose on the vessel and setting the same to the desired magnetic heading of the vessel by setting the zero radial to coincide with the north magnetic heading
    positioning an outer compass rose to the directional axis of the vessel to simulate a non-directional radio signal
    manually displacing the simulated vessel by the student to a different special location in order to ascertain the angular relation between the aircraft and the navigational aids being utilized.

* * * * *